United States Patent
Fayeulle

(10) Patent No.: US 7,158,328 B2
(45) Date of Patent: Jan. 2, 2007

(54) MULTI-PHASE ACCELERATION OF A DATA STORAGE DISC

(75) Inventor: Serge Jacques Fayeulle, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 930 days.

(21) Appl. No.: 09/982,366

(22) Filed: Oct. 17, 2001

(65) Prior Publication Data

US 2002/0135924 A1    Sep. 26, 2002

Related U.S. Application Data

(60) Provisional application No. 60/277,763, filed on Mar. 21, 2001.

(51) Int. Cl.
*G11B 15/46* (2006.01)

(52) U.S. Cl. .................................... 360/73.03

(58) Field of Classification Search ............. 360/73.03, 360/75, 77.05, 78.04, 78.06, 31, 60, 51, 73.08; 369/53.23, 47.41; 318/597, 254, 561, 618
See application file for complete search history.

(56) References Cited

U.S. PATENT DOCUMENTS

| | | | | |
|---|---|---|---|---|
| 4,031,443 A * | 6/1977 | Droux et al. | ................ | 318/561 |
| 4,288,731 A * | 9/1981 | Lee | ............... | 318/618 |
| 4,920,462 A * | 4/1990 | Couse et al. | ............. | 360/78.04 |
| 5,305,161 A * | 4/1994 | Giovanetti et al. | ...... | 360/78.06 |
| 5,471,353 A | 11/1995 | Codilian et al. | ............ | 360/73.3 |
| 5,594,595 A * | 1/1997 | Zhu | ............................ | 360/31 |
| 5,642,342 A * | 6/1997 | Murata | ..................... | 369/47.41 |
| 5,650,886 A * | 7/1997 | Codilian et al. | .......... | 360/73.03 |
| 5,729,399 A | 3/1998 | Albrecht et al. | .............. | 360/75 |
| 5,742,446 A * | 4/1998 | Tian et al. | ..................... | 360/75 |
| 6,061,198 A | 5/2000 | Shrinkle | ....................... | 360/75 |
| 6,088,185 A * | 7/2000 | Ratliff et al. | ............. | 360/77.03 |
| 6,222,336 B1 * | 4/2001 | McKenzie et al. | .......... | 318/448 |
| 6,239,935 B1 | 5/2001 | Shrinkle | ....................... | 360/75 |
| 6,243,222 B1 * | 6/2001 | Boutaghou et al. | ...... | 360/73.03 |
| 6,285,522 B1 * | 9/2001 | McKenzie et al. | ........ | 360/77.05 |
| 6,304,406 B1 * | 10/2001 | Douglas et al. | ........... | 360/73.03 |
| 6,362,452 B1 * | 3/2002 | Suzuki et al. | ........... | 219/121.69 |
| 6,377,527 B1 * | 4/2002 | Hirashima | ................ | 369/53.23 |
| 6,392,833 B1 * | 5/2002 | Wood et al. | .............. | 360/73.03 |
| 6,411,056 B1 * | 6/2002 | Ikedo et al. | .................. | 318/597 |

(Continued)

FOREIGN PATENT DOCUMENTS

EP    53069210    8/1978

*Primary Examiner*—Fred F. Tzeng
(74) *Attorney, Agent, or Firm*—David K. Lucente; Derek J. Berger

(57) ABSTRACT

A disc drive having a multi-phase acceleration procedure is disclosed. The multi-phase acceleration procedure accelerates a data storage disc in the disc drive from an initial rotational velocity to a final rotational velocity. As the disc reaches the final rotational velocity, a read/write head operable to access data on the disc is moved by a servo control system from a landing zone to a data region on the disc. An air bearing between a slider of the read/write head and the surface of the disc is created due to the final rotational velocity of the spinning disc. The read/write head may also be moved from the landing zone as the disc reaches an early exit rotational velocity. As such, the multi-phase acceleration procedure continues accelerating the disc until the final rotational velocity to guarantee that the air bearing is maintained between the head and the disc.

24 Claims, 8 Drawing Sheets

U.S. PATENT DOCUMENTS

| | | | |
|---|---|---|---|
| 6,487,033 B1 * | 11/2002 | Heydt et al. | 360/60 |
| 6,577,088 B1 * | 6/2003 | Heydt et al. | 318/254 |
| 6,587,293 B1 * | 7/2003 | Ding et al. | 360/51 |
| 6,614,617 B1 * | 9/2003 | Galloway | 360/78.06 |
| 6,710,964 B1 * | 3/2004 | Rao et al. | 360/75 |

* cited by examiner

MULTI-PHASE ACCELERATION OF A DATA STORAGE DISC

Related Applications

This application claims priority of U.S. provisional application Ser. No. 60/277,763, entitled "Multi-Step Acceleration Method for CSS Applications," filed Mar. 21, 2001.

FIELD OF THE INVENTION

This application relates generally to a data storage device and more particularly, but not limited to, a multi-phase acceleration procedure for rotating a data storage disc in a disc drive.

BACKGROUND OF THE INVENTION

Modern hard disc drives comprise one or more rigid discs that are coated with a magnetizable medium and mounted on a spindle hub of a spindle motor for rotation at a high speed. Information is read from and written to each disc on a plurality of concentric tracks by a read/write head mounted on an actuator arm. The outside circumference of each disc is referred to as the "outer diameter" (OD), and the center of each disc is referred to as the "inner diameter" (ID). A read/write head is said to "fly" over the disc surface as the disc rotates. When disc rotational velocity decreases, the layer of air supporting the read/write head above the disc surface diminishes and the head descends toward the disc surface. Contact between the read/write head and the disc surface can damage the magnetizable medium and the head. Furthermore, through a phenomenon called "stiction," a read/write head can become temporarily "stuck" to the disc surface after landing on the disc surface. Stiction can damage the magnetizable medium, the read/write head, and/or the actuator arm when the disc drive system initiates disc rotation in an attempt to move the read/write head from the disc surface.

A conventional contact-start-stop (CSS) solution may be used to address this problem. In a disc drive system utilizing a CSS interface, a read/write head lands and is parked on a textured landing zone, preferably near the ID of the disc, as the disc loses rotational velocity and eventually completes spinning. Typically, data is not recorded in the landing zone, and the texturing of the landing zone surface minimizes stiction. The read/write head is moved from the landing zone and back to data areas on the disc when the rotational velocity increases to allow the head to fly above the disc surface.

In order to decrease flying height and increase aerial density, conventional CSS solutions have moved toward the use of a padded slider taking off and landing in a laser textured landing zone with lower laser bumps. However, such an implementation is not without problems. For instance, the padded slider solutions result in high friction forces during contact between the slider and the landing zone. Furthermore, a padded slider may result in excessive wear of the coating on the disc. Yet another problem associated with padded sliders concerns normal wear, and thus maintenance of, the padded slider pads. Excessive wear of both the coatings on the discs and the pads on the sliders may lead to premature failure and crash of the head media interface. Wear of the slider pads may also result in an increase of stiction between the slider and the disc surface.

SUMMARY OF THE INVENTION

Against this backdrop the present invention has been developed. The present invention is a multi-phase acceleration procedure for rotating a disc in a disc drive. More particularly, the multi-phase acceleration procedure rotates the disc from an initial rotational velocity ($V_i$) to a final rotational velocity ($V_F$) over a predetermined time period ($T_F-T_i$). The multi-phase acceleration procedure applies multiple acceleration steps, rates or phases to the disc to initiate rotation by the disc at an initial time ($T_i$) and set the rotational velocity of the disc at the final rotational velocity ($V_F$). Predetermined constraints and parameters, such as the initial rotational velocity ($V_i$), the time ($T_i$) at which the disc is spinning at the initial rotational velocity ($V_i$), the final rotational velocity ($V_F$) of the disc and the time ($T_F$) at which the disc reaches final rotational velocity ($V_F$), may be defined to be any value or range of values, depending on any number of factors, including, but not limited to, disc drive design and operating specifications.

In accordance with an embodiment, the multi-phase acceleration procedure may be utilized in creating and maintaining an air bearing between a slider of a read/write head and the disc surface as the read/write head accesses tracks on the disc surface in response to a read/write instruction. As such, the final rotational velocity ($V_F$) may be defined as a velocity sufficient to maintain the air bearing as the read/write head radially traverses across the disc between an inner diameter of the disc and an outer diameter. As the disc reaches the final rotational velocity ($V_F$), the read/write head may be moved from a landing zone to one or more data zones on the disc. By accelerating the disc at multiple acceleration phases, friction forces between the slider and the surface of the disc may be minimized or completely eliminated, thereby reducing wear on both the landing zone surface and the slider.

In accordance with another embodiment, the multi-phase acceleration procedure may accelerate the disc at multiple acceleration rates based on predetermined time periods between an initial time parameter ($T_i$) and a final time parameter ($T_F$). As such, the disc may be accelerated at a first acceleration rate from time $T_i$ to a predefined time parameter ($T_N$), but accelerated at a second acceleration rate from time $T_N$ to the time $T_F$. Time $T_F$ may correspond to a time that the rotational velocity of the disc has reached a velocity sufficient to create and maintain an air bearing between a slider of the head and the surface of the disc as the head radially traverses across the disc between the inner diameter and the outer diameter. Thus, the read/write head may be moved from the landing zone to one or more data zones on the disc at time $T_F$.

In accordance with another embodiment, the multi-phase acceleration procedure may be used as the read/write head exits the landing zone and enters one or more data regions on the disc as the disc is rotating at a rotational velocity that is less than the final rotational velocity ($V_F$) As such, the read/write head may exit the landing zone as the disc reaches a desired early exit velocity ($V_D$). Thus, the multi-phase acceleration procedure may accelerate the disc at one or more acceleration rates after the head has exited the landing zone in order to maintain the air bearing as the head is moved across the disc toward the outer diameter.

The present invention also can be implemented as a computer-readable program storage device which tangibly embodies a program of instructions executable by a computer system to accelerate a data storage disc at multiple acceleration rates to attain a final rotational velocity of the rotating disc.

These and various other features as well as advantages which characterize the present invention will be apparent from a reading of the following detailed description and a review of the associated drawings.

DETAILED DESCRIPTION

Figure 1:
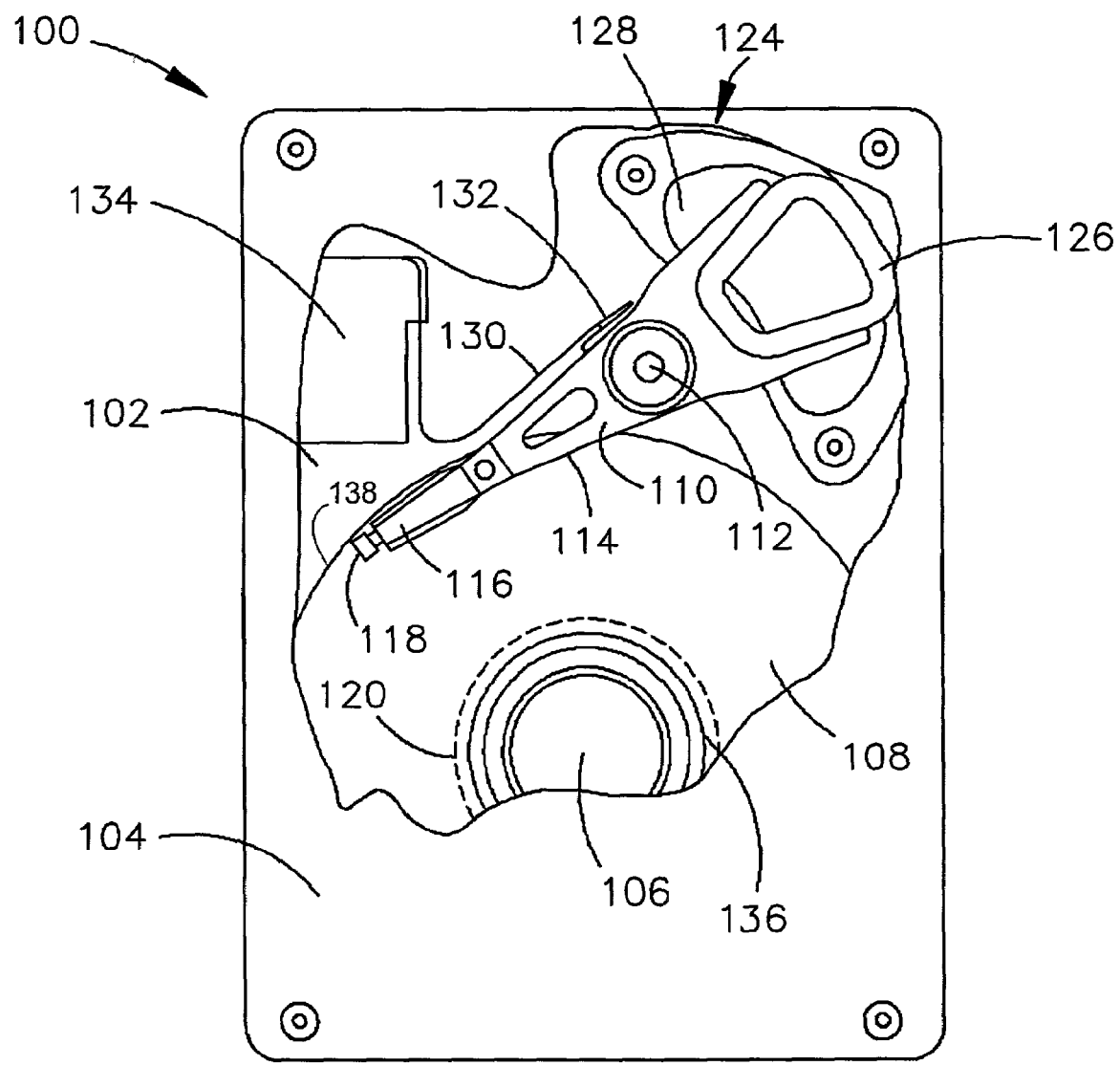
FIG. 1 is a plan view of a disc drive incorporating a preferred embodiment of the present invention showing the primary internal components.

The present invention and its various embodiments are described in detail below with reference to the figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 156 (FIG. 2) which rotates a spindle hub 106 and one or more discs 108 attached to the hub 106 at a constant high speed. A magnetic media disc 108 is used to illustrate a preferred embodiment of the present invention, but the present invention may be implemented using other types of data storage discs. Information is written to and read from tracks 306 (FIG. 3) on the discs 108 through the use of an actuator assembly 110, which rotates about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer, or read/write head 118, which includes an air bearing slider (not shown) enabling the read/write head 118, to fly in close proximity above the corresponding surface of the associated disc 108.

The spindle motor 156 is typically de-energized when the disc drive 100 is not in use for extended periods of time. In accordance with an embodiment of the present invention, the read/write heads 118 may be moved over park, or landing, zones 120 near the inner diameter (ID) 136 of the discs 108 when the drive motor 156 is de-energized. The read/write heads 118 may be secured over the landing zones 120 through the use of an actuator latch arrangement (not shown), which prevents inadvertent rotation of the actuator assembly 110 when the heads 118 are parked. This latch arrangement is typically a magnetic latch which magnetically holds the actuator assembly 110 against a stop. Although the landing zone 120 is shown in FIG. 1 as located in close proximity to the inner diameter 136 of the discs 108, a landing zone 120 may also be located in close proximity to an outer diameter (OD) 138 of the discs 108. Furthermore, a landing zone 120 may be located on any portion of the discs 108 between the outer diameter 138 and the inner diameter 136 of the discs 108.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
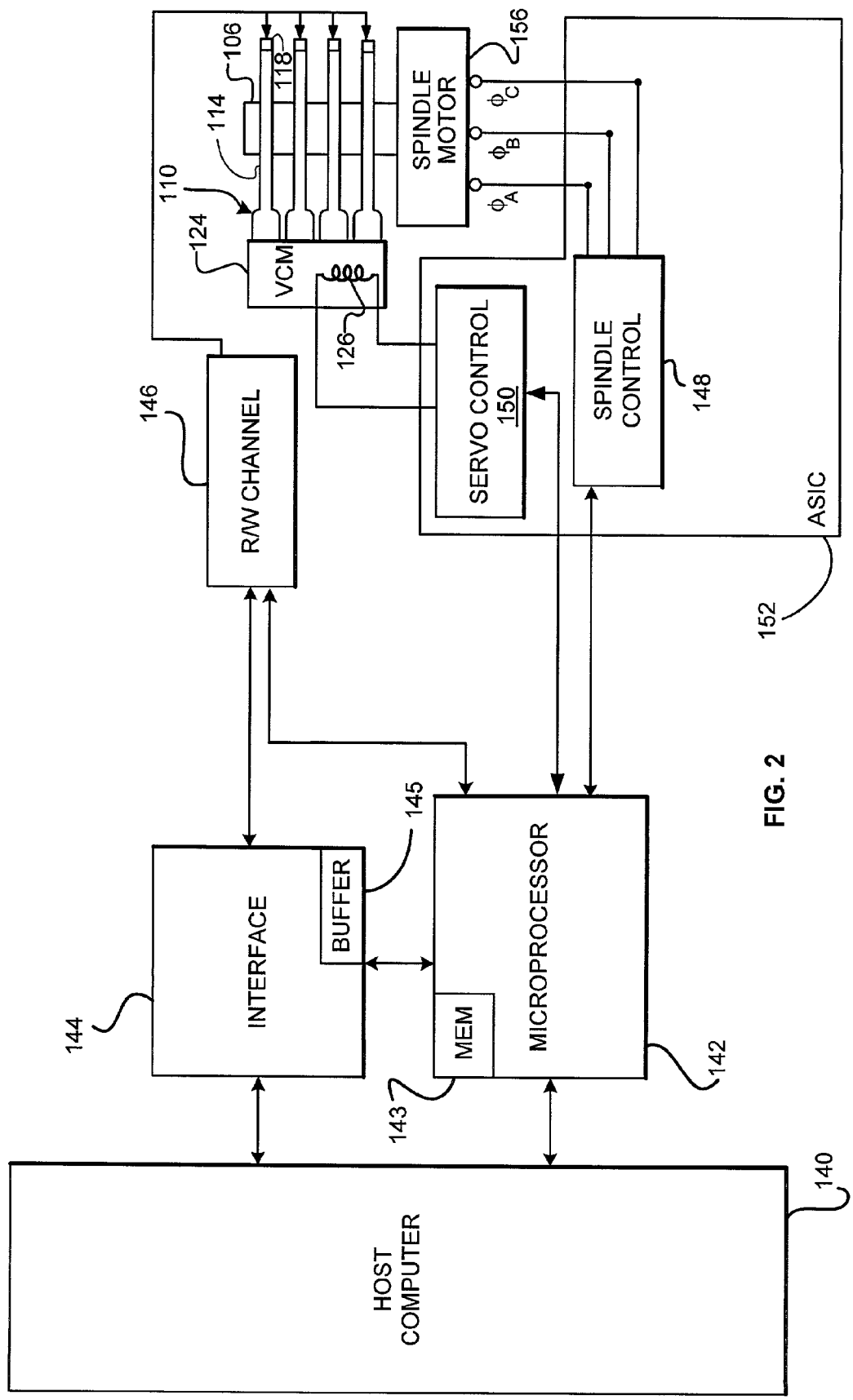
FIG. 2 is a functional block diagram generally showing the main functional components used to control the disc drive of FIG. 1.

Referring now to FIG. 2, shown therein is a functional block diagram of the disc drive 100 shown in FIG. 1 generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM), and other sources of resident memory for the microprocessor 142. The discs 108 are rotated on the spindle hub 106 at a constant high speed by a spindle motor 156 that is controlled by a spindle control module 148. The spindle control module 148 is a component of an application specific integrated chip (ASIC) 152 receiving instructions related to rotational velocity from the microprocessor 142. The microprocessor 142 sets the rotational velocity of the spindle hub 106, and thus the discs 108 attached thereto, by communicating with the spindle control module 148. Accordingly, the spindle control module 148 receives instructions from the microprocessor 142 directing the control module 148 to set the rotational velocity of the discs 108.

Although the spindle control module 148 may be implemented as any type of hardware, i.e. a digital or analog circuit, or software, i.e., machine or computer based programming language, for illustration purposes and not by means of limitation, the spindle control module 148 is described hereafter as an analog circuit. As such, once the spindle control module 148 is instructed of the desired rotational speed of the discs 108 via communication with the microprocessor 142, the spindle control module 148 supplies current to windings (not shown) of the spindle motor 156. Current supplied to the windings may be generated from a power supply, such as a battery source, and regulated by the spindle control module 148 such that the magnitude of the current dictates the rotational speed of the discs 108 attached to the spindle hub 106. The spindle motor 156 may be a "Y" type brushless, three-phase spindle motor 156 having fixed windings (not shown) as field coils in accordance with one embodiment of the present invention. As such, the spindle control module 148 serves as a power supply to the spindle motor 156 by generating a current through the windings (not shown) of the motor 156.

The radial position of the heads 118 over the rotating discs 108 is controlled through the application of current to a coil 126 of the VCM 124. A servo control system 150 provides such control. Like the spindle control module 148, the servo control system 150 is a component of the ASIC 152 and thus receives instructions from the microprocessor 142. In executing a read or write command, the microprocessor 142 receives servo information identifying the position of the read/write head 118 on the disc 108. Based on this servo information, the microprocessor 142 instructs the servo control system 150 of the displacement needed in order for the head 118 to seek from an origination track 306 associated with the current head position to a destination track 306. The servo control system 150 then supplies a current to the coil 126 of the VCM 124 based on the instruction from the microprocessor 142. The controlled application of current to the coil 126 causes magnetic interaction between the permanent magnets 128 (FIG. 1) and the coil 126 so that the coil 126 moves in accordance with the well-known Lorentz relationship. As the coil 126 moves, the actuator arms 114 about the bearing shaft assembly 112 and the heads 118 are caused to move across the surfaces of the rotating discs 108.

Data is transferred between the host computer 140 and the disc drive 100 by way of a disc drive interface 144, which includes a buffer 145 to facilitate high speed data transfer between the host computer 140 and the disc drive 100. Data to be written to the discs 108 are thus passed from the host computer 140 to the buffer 145 and then to a read/write channel 146, which encodes and serializes the data and provides the requisite write current signals to the heads 118. To retrieve data that has been previously stored by the disc drive 100, read signals are generated by the heads 118 and provided to the read/write channel 146. The interface 144 performs read signal decoding, error detection, and error correction operations. The interface 144 then outputs the retrieved data to the buffer 145 for subsequent transfer to the host computer 140. Such operations of the disc drive 100 are well known in the art and are discussed, for example, in U.S. Pat. No. 5,276,662 issued Jan. 4, 1994, to Shaver et al.

At disc drive power down, the microprocessor 142 transmits a signal to the spindle control module 148 instructing the module 148 to discontinue the application of current to the windings (not shown) of the spindle motor 156. The spindle control module 148 may include circuitry, such as relays, solid-state switches, such as a field effect transistor (FET), or other switching device to open-circuit the output lines of the spindle control module 148 to the spindle motor 156 thereby disconnecting the spindle control module 148 from the spindle motor 156. The spindle hub 106, and thus the discs 108 rotating around the spindle hub 106, immediately begin to lose rotational velocity as the discs 108 continue spinning due to rotational inertia in the discs 108.

At disc drive power down, in order to prevent the heads 118 from contacting the data zones or regions 304 (FIG. 3) on the surface of the discs 108, the servo control system 150 directs the read/write heads 118 to a location away from the data zones 304 of the disc. In accordance with an embodiment of the present invention, this location may be a landing zone 120 in close proximity to the ID 136 of the discs. In accordance with other embodiments, a landing zone 120 may be located in close proximity to the OD 138 of the discs 108 or on a region between the OD 138 and the ID 136.

Regardless of the position of the landing zones 120 on the surface of the discs 108, the landing zones 120 may be either non-textured, i.e., smooth surface, or laser-textured. Likewise, the read/write heads 118 may contain textured or non-textured sliders (not shown). A specific interface between a disc 108 and a read/write head 118 may be defined based on the configuration, i.e., textured or non-textured, of the disc 108 and the slider of the head 118. For example, a LAP interface (Laser Assisted Pad) may be defined as a configuration having a laser-textured disc surface and a textured, or padded, slider. A laser-texture zone (LZT) interface may be defined as a configuration having a laser-textured disc surface and a non-textured, or non-padded, slider. A SLIP interface (Slider Landing Integrated Pad) may be defined as a configuration having a non-textured disc surface and a textured, or padded, slider. In accordance with various embodiments of the present invention, the disc drive 100 may contain LAP, LZT or SLIP interfaces between the heads 118 and discs 108.

Although FIGS. 3, 4, 5, 6, 7, 8, 9 and 10 are hereafter described with reference to a single disc 108, which only has a single type of interface, the disc drive 100 may contain any number of discs 108, with each disc 108 having any type of interface, such as a SLIP interface, a LAP interface or an LZT interface. As such, a disc drive 100 may include a first disc 108 having an LAP interface between the disc 108 and an associated read/write head 118, a second disc 108 having an LAP interface between the disc 108 and an associated read/write head 118 and a third disc 108 having an LZT interface between the disc 108 and an associated read/write head 118. Furthermore, the two surfaces of each disc 108 may have separate types of interfaces between the surfaces of the disc 108 and an associated read/write head 118. As such, it is possible for a top surface of a disc 108 to have a SLIP interface between the disc 108 and an associated read/write head 118 and a bottom surface of the same disc 108 to have an LZT interface between the disc 108 and an associated read/write head 118.

Figure 3:
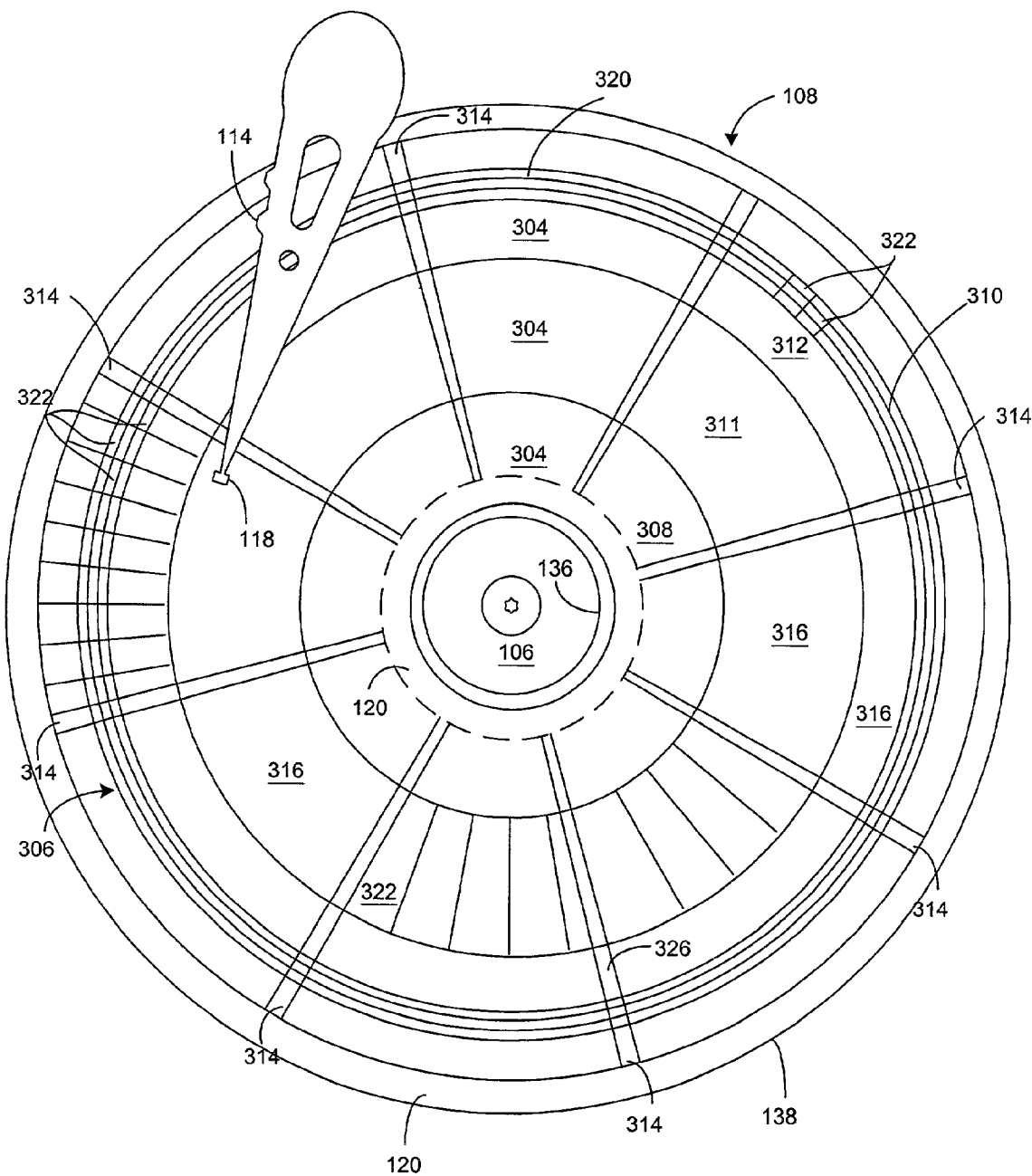
FIG. 3 is a plan view of a disc generally showing the main components on the surface of the disc in accordance with an embodiment of the present invention.

FIG. 3 shows the logical recording structure of an exemplary disc 108 of the disc drive 100. The disc 108 is divided into several concentric data zones 304 which contain regions of adjacent tracks 306. For example, the magnetic disc 108 of FIG. 3 includes an inner zone 308, a center zone 311, and an outer zone 312. When configured with servo burst sectors 314, each disc track 306 is divided into slices called data wedges 316. The burst sectors 314 include data for maintaining accurate positioning of the disc head 118 and are positioned in predetermined locations along the disc 108. As the disc 108 rotates, the data head 118 reads the servo information containing an address within the servo bursts 314 and sends the servo information back to the servo control system 150. The servo control system 150 checks whether the address in the servo information read from the burst sectors 314 corresponds to the desired head location. If the address does not correspond to the desired head location, the actuator arm 114 is adjusted until the head 118 is moved to the correct track location.

Each track 306 includes discrete data sectors 322 containing stored user information. The number of data sectors 322 contained in a particular track 306 depends, in part, on the length (i.e., circumference) of the track 306. Therefore, tracks 306 located at the outer zone 312 typically contain more data sectors 322 per data wedge 316 than tracks 306 located at the center zone 311. Similarly, tracks 306 located at the center zone 311 typically contain more data sectors 322 per data wedge 316 than tracks 306 located at the inner zone 308. Besides containing user information, each data sector 322 also may include other data to help identify and process the user information. Tracks 306 may also contain one or more permanently defective sectors 322 that cannot be reliably written to or read from by the disc drive 100 circuitry. For this reason, a number of alternate sectors are provided in one or more alternate tracks 320 to which data that is intended to be written in these defective sectors can be revectored.

In accordance with an embodiment of the present invention, the disc 108 may include one or more landing zones 120 for parking the read/write head 118 while the drive 100 is de-energized. As such, the head 118 is prevented from inadvertently contacting the surface of the disc 108 while the disc 108 is stationary. The use of a landing zone 120 to disengage a head 118 from data regions on the surface of the disc 108 is commonly found in disc drives 100 administering a contact start/stop (CSS) technique. With respect to the CSS technique, the servo control system 150 controls the actuator 114 such that the slider (not shown) contacts the landing zone 120 during start and stop operations when there is insufficient rotational speed to maintain the air bearing between the surface of the disc 108 and the slider. As described above, the landing zone 120 may be a dedicated radial region on the disc 108 that is specially textured to minimize the effect of stiction, which is static friction between a very smooth disc surface and a slider of a head 118.

Figure 4:
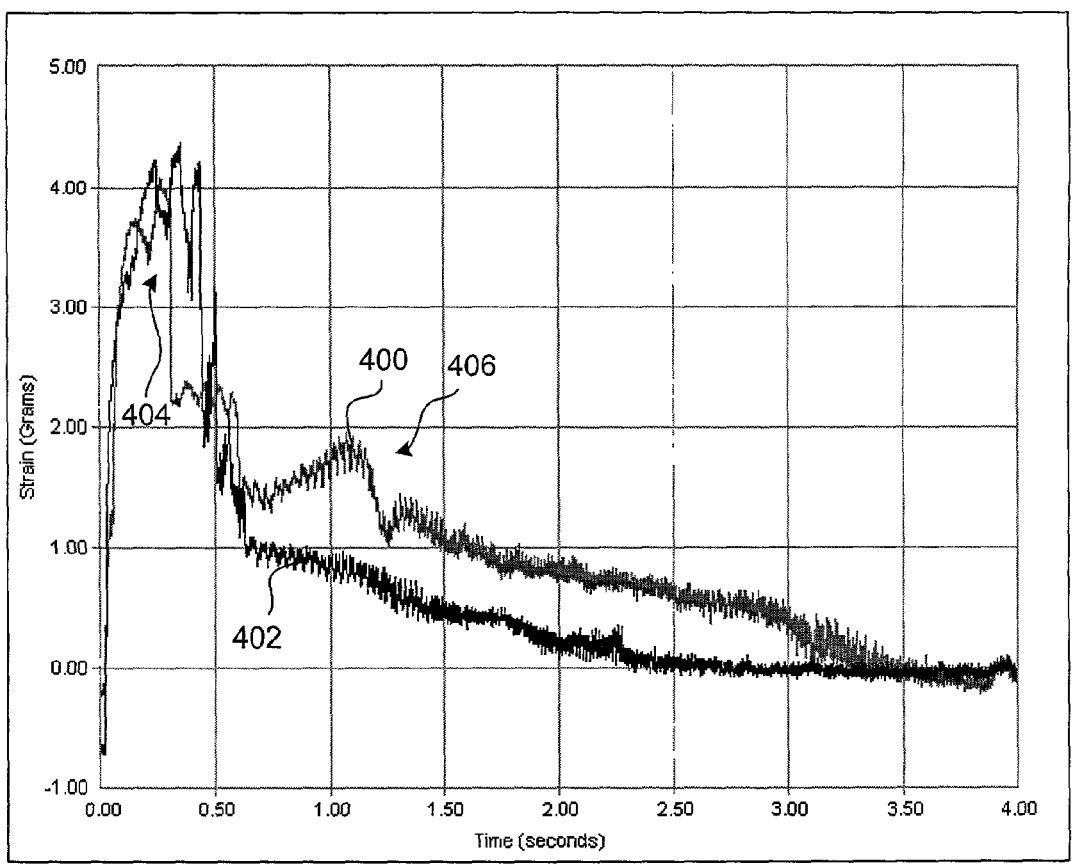
FIG. 4 is a graphical representation of friction force evolution as rotational velocity of a disc is increased from an initial velocity to a final rotational velocity at a constant acceleration.

Referring to FIG. 4, a graphical representation of friction force evolution as rotational velocity of a disc 108 is increased from zero velocity to a final rotational velocity at a constant acceleration. More specifically, FIG. 4 shows a graphical representation illustrating friction forces associated with an LAP interface and an SLIP interface as the rotational velocity of a disc 108 increases at a constant acceleration over a given time period. Friction force is directly correlated to friction energy, which is the energy dissipated in contact between the slider of the read/write head 118 and the surface of the disc 108 mainly though heat generation and the wear of materials. Thus, friction force may be defined as friction energy divided by contact length.

Figure 5:
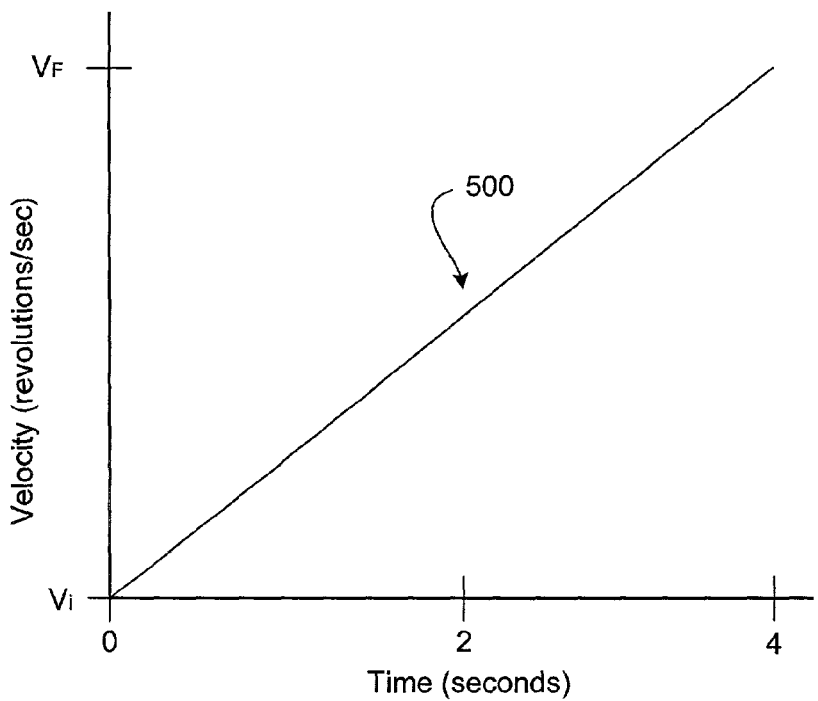
FIG. 5 is a graphical representation illustrating a change in rotational velocity over time as the disc of FIG. 4 is subjected to a constant acceleration between the initial velocity and the final velocity.

FIG. 5 depicts a graphical representation illustrating a change in rotational velocity over time as the disc 108 of both the LAP interface and SLIP interface of FIG. 4 is subjected to the constant acceleration. As such, FIGS. 4 and 5 are described below in tandem. Friction forces associated with a SLIP interface as rotational velocity of the disc 108 increases from an initial velocity ($V_i$) of 0 revolutions/second to a final rotational velocity ($V_F$) at the constant acceleration is shown by a SLIP plot 400. Likewise, friction forces associated with an LAP interface as the rotational velocity of the disc 108 increases from an initial velocity ($V_i$) of 0 revolutions/second to the final velocity ($V_F$) at a constant acceleration is shown by an LAP plot 402. With respect to both the SLIP plot 400 and the LAP plot 402, friction forces are measured between an initial time is ($T_i$) and a final time ($T_F$), wherein the initial time ($T_i$) represents the beginning of disc rotation and the final time ($T_F$) represents a desired time at which the rotational velocity of the disc 108 reaches the final velocity ($V_F$). As an example, and not a means of limitation, the time for the disc 108 to reach the final rotational velocity ($V_F$) is described and shown in FIGS. 4 and 5 as 4 seconds. Thus, the initial time ($T_i$) is 0 seconds and the final time ($T_F$) is 4 seconds. However, it should be appreciated that predetermined constraints and parameters, such as the time ($T_F$) for a disc to reach final velocity ($V_F$), may be defined to be any value or range of values, depending on any number of factors, including, but not limited to, disc drive design and operating specifications.

Referring to FIG. 5, as the spindle control module 148 receives instructions from the microprocessor 142 to excite rotation by the spindle hub 106, and thus the disc 108 attached thereto, a current is applied to the windings (not shown) of the spindle motor 156 thereby initiating rotation of the disc 108. Thus, time 0 seconds of FIG. 5 represents a point in time that disc rotation is initiated, thus, the rotational velocity of the disc 108 is the initial velocity ($V_i$). The rotational velocity of the disc 108 is then accelerated at a constant acceleration for 4 seconds to the final velocity ($V_F$). As such, a plot 500 shows a constant increase in velocity from 0 seconds to 4 seconds. Once the rotational velocity of the disc 108 reaches final rotational velocity ($V_F$), the servo control system 150 moves the read/write head 118 from the landing zone 120 to a data region 304 on the disc 108. As such, the final velocity ($V_F$) is preferably defined as a velocity sufficient to create and maintain an air bearing between the slider of the read/write head 118 and the surface of the disc 108 as the head 118 accesses the surface of the disc 108 between the ID 136 and the OD 138.

In accordance with an alternative embodiment, which may be referred to as an "early exit technique," the read/write head 118 may exit the landing zone 120 at a time prior to the rotational velocity of the disc 108 reaching final rotational velocity ($V_F$). In disc drives 100 implementing the early exit technique, the servo control system 150 moves the read/write head 118 from the landing zone 120 to a data region on the disc 108 at a desired early exit velocity ($V_D$). The desired early exit velocity ($V_D$) may preferably be a velocity sufficient to create an air bearing between the slider of the head 118 and the surface of the disc 108 as the head 118 is in close proximity to the ID 136.

As an example, and not a means of limitation, the final rotational velocity ($V_F$) may be defined as 7200 revolutions/second. Hence, taking the change in velocity ($\Delta V$), which is defined as $V_i$ subtracted from $V_F$, over the change in time ($\Delta T$), which is 4 seconds, the acceleration applied to the disc 108 is defined at 1800 revolutions/second$^2$. As such, if the disc 108 is rotated at an acceleration of 1800 revolutions/second, after 4 seconds the disc 108 rotates at 7200 revolutions/second and the servo control system 150 moves the head 118 from the landing zone 120 to a data region 304 as an air bearing is already defined between the surface of the disc 108 and the slider due to the rotational velocity of the disc 108. Contrarily, if the disc drive 100 utilizes the early exit technique, the disc drive 100 is preferably designed such that rotation of the disc 108 is increased at a greater acceleration as compared to a disc drive 100 not implementing the early exit technique.

Referring to FIG. 4, the SLIP plot 400 shows that, for a padded slider-smooth disc configuration, after a first phase 404 of rapid increase and decrease in friction forces, a second phase 406 occurs where friction first increases then decreases slowly. This second phase 406 is primarily due to contact of the trailing edge of the slider when the pitch angle is increased because of the increasing rotational velocity of the disc 108. Referring to the LAP plot 402, although a second phase 406 of friction increase is not seen as a padded slider takes off from a textured disc surface, a first phase 404 of friction forces actually last longer in time than the increase realized with the SLIP interface. Whereas the forces shown by the SLIP plot 400 decrease from approximately 4 grams to approximately 2 grams after 0.25 seconds, forces shown by the LAP plot 402 remain at approximately 4 grams until approximately 0.45 seconds. As such, applying a constant acceleration to the rotating disc 108 results in undesirable friction forces between the slider, whether padded or non-padded, and the landing zone 120 surface, whether textured or non-textured. In accordance with an embodiment of the invention, multiple acceleration phases may be applied to a disc 108 between an initial time ($T_i$) of zero velocity and a final time ($T_F$) corresponding to a final rotational velocity ($V_F$). By accelerating the disc 108 at multiple acceleration rates, disc rotation is initiated at the initial time ($T_i$) and the rotational velocity of the disc 108 is increased at the multiple acceleration rates until the rotational velocity of the disc 108 reaches the final velocity ($V_F$). Such a multi-stage acceleration procedure eliminates the second phase 406 of friction forces and reduces the length in time that friction forces are realized between the slider and the disc surface as the disc 108 rotates between the initial time ($T_i$) and the final time ($T_F$).

Figure 6:
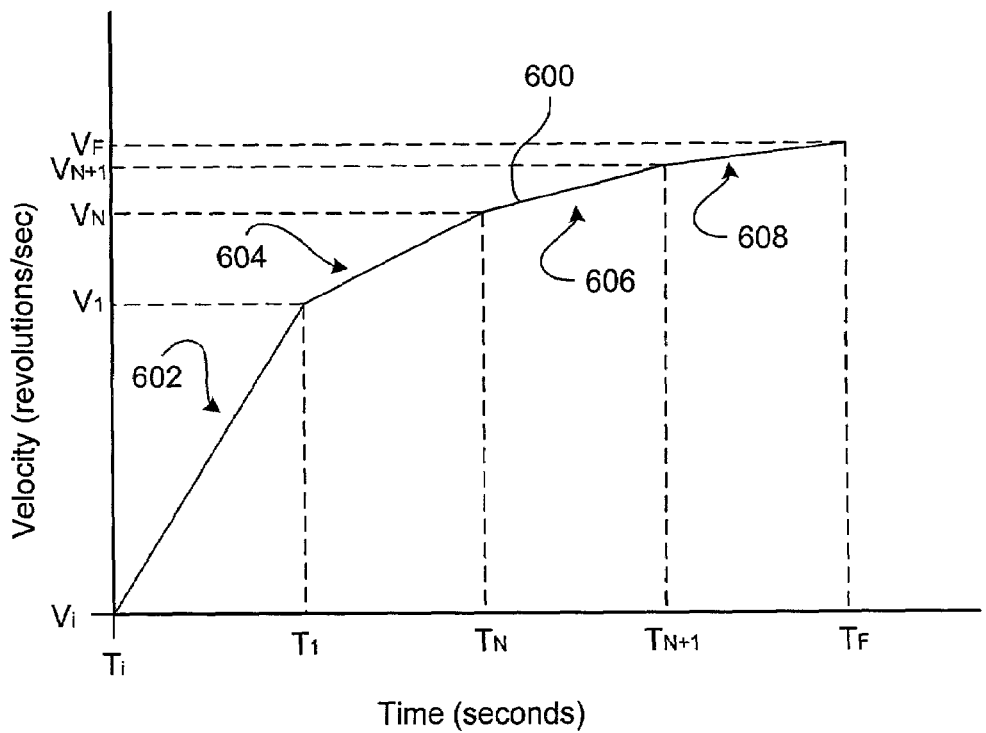
FIG. 6 is a graphical representation illustrating a change in rotational velocity over time as a disc is subjected to multiple phases of acceleration in accordance with an embodiment of the present invention.

FIG. 6 depicts a graphical representation illustrating a change in rotational velocity over time as a disc 108 is subjected to multiple phases, rates, stages or steps of acceleration in accordance with an embodiment of the present invention. As such, FIG. 6 shows a multi-phase acceleration procedure for rotating a disc 108 at multiple acceleration rates in accordance with an embodiment of the present invention. The disc drive 100 is designed such that final rotational velocity ($V_F$) is attained in the rotating disc 108 at a predetermined final time ($T_F$). Thus, the time for the disc 108 to reach the final rotational velocity ($V_F$) is described and shown in FIG. 6 as the final time ($T_F$) in seconds. Whereas the final time ($T_F$) is preferably a predetermined time constant, the initial time ($T_i$) is preferably 0 seconds. As an example, and not a means of limitation, the final time ($T_F$) is hereafter described in FIG. 6 as 4 seconds and the corresponding final rotational velocity ($V_F$) is described as 7200 revolutions/second. However, it should be appreciated that predetermined constraints and parameters, such as final rotational velocity of the disc 108 and the time ($T_F$) at which the disc 108 reaches final rotational velocity ($V_F$), may be defined to be any value or range of values, depending on any number of factors, including, but not limited to, disc drive design and operating specifications.

As the spindle control module 148 receives instructions from the microprocessor 142 to excite rotation by the spindle hub 106, and thus the disc 108 attached thereto, a current is applied to the windings (not shown) of the spindle motor 156 thereby initiating rotation of the disc 108. Thus, time 0 seconds of FIG. 6 represents a point in time that disc rotation is initiated, thus, the rotational velocity of the disc 108 is an initial rotational velocity ($V_i$). The rotational velocity of the disc 108 is then accelerated at a first acceleration rate 602 from the initial rotational velocity ($V_i$) to a first velocity ($V_1$). As such, a plot 600 shows a constant increase in velocity from $T_i$ seconds to $T_1$ seconds. The rate of acceleration may be determined by dividing the change in rotational velocity of the disc 108 by the time period associated with the velocity change (assuming a constant acceleration). Thus, the first acceleration rate 602 may be defined by the following equation:

$$a_1 = \Delta V/\Delta T = (V_1 - V_i)/(T_1 - T_i) [\text{revs}/\text{s}^2]$$

As an example to illustrate FIG. 6, and not a means of limitation, the first velocity ($V_1$) may be defined at 3000 revolutions/second and $T_1$ may be predetermined at 1 second. Thus, the first acceleration rate 602 ($a_1$) is defined as 3000 revs/s$^2$.

After the rotational velocity of the disc 108 reaches the first velocity ($V_1$), which according to the example is 3000 revolutions/second, the spindle control module 148 changes the rate of acceleration of the spindle hub 106, and thus the discs 108 rotating thereto, to a second acceleration rate 604 in accordance with an embodiment of the present invention. Specifically, the disc 108 is then accelerated at a second acceleration rate 604 from the first velocity ($V_1$) to a second velocity ($V_N$). As such, a plot 600 shows a constant increase in velocity from $T_1$ seconds to $T_N$ seconds. As mentioned above, the rate of acceleration may be determined by dividing the change in rotational velocity of the disc 108 by the time period associated with the velocity change. Thus, the second acceleration rate 604 may be defined by the following equation:

$$a_2 = \Delta V/\Delta T = (V_N - V_1)/(T_N - T_1) [\text{revs}/\text{s}^2]$$

To further illustrate the above example, and not a means of limiting the present invention, the second velocity ($V_N$) may be defined at 5000 revolutions/second and $T_N$ may be predetermined at 2 seconds. Thus, the second acceleration rate 604 ($a_2$) is defined as 2000 revs/s$^2$.

After the rotational velocity of the disc 108 reaches the second velocity ($V_N$), which according to the example is 5000 revolutions/second, the spindle control module 148 may change the rate of acceleration of the spindle hub 106, and thus the discs 108 rotating thereto, to a third acceleration rate 606 in accordance with an embodiment of the present invention. Specifically, the disc 108 is then accelerated at a third acceleration rate 606 from the second velocity ($V_N$) to a third velocity ($V_{N+1}$). As such, a plot 600 shows a constant increase in velocity from $T_N$ seconds to $T_{N+1}$ seconds. As mentioned above, the rate of acceleration may be determined by dividing the change in rotational velocity of the disc 108 by the time period associated with the velocity change. Thus, the third acceleration rate 606 may be defined by the following equation:

$$a_3 = \Delta V / \Delta T = (V_{N+1} - V_N)/(T_{N+1} - T_N) [\text{revs}/s^2]$$

To further illustrate the above example, and not a means of limiting the present invention, the third velocity ($V_{N+1}$) may be defined at 6200 revolutions/second and $T_{N+1}$, may be predetermined at 3 seconds. Thus, the third acceleration rate 606 ($a_3$) is defined as 1200 revs/$s^2$.

After the rotational velocity of the disc 108 reaches the final velocity ($V_{N+1}$), which according to the example is 6200 revolutions/second, the spindle control module 148 may yet further change the rate of acceleration of the spindle hub 106, and thus the discs 108 rotating thereto, to a fourth and final acceleration rate 608 in accordance with an embodiment of the present invention. Specifically, the disc 108 is then accelerated at a fourth acceleration rate 608 from the third velocity ($V_{N+1}$) to a fourth velocity ($V_F$), which in accordance with the example of FIG. 6 is also the final rotational velocity. As such, a plot 600 shows a constant increase in velocity from $T_{N+1}$ seconds to $T_F$ seconds. As mentioned above, the rate of acceleration may be determined by dividing the change in rotational velocity of the disc 108 by the time period associated with the velocity change. Thus, the fourth acceleration rate 608 may be defined by the following equation:

$$a_4 = \Delta V / \Delta T = (V_F - V_{N+1})/(T_F - T_{N+1}) [\text{revs}/s^2]$$

To further illustrate the above example, and not a means of limiting the present invention, the fourth velocity ($V_F$) may be defined at 7200 revolutions/second and $T_F$ may be predetermined at 4 seconds. Thus, the fourth and final acceleration rate 608 ($a_4$) is defined as 1000 revs/$s^2$.

After the rotational velocity of the disc 108 reaches the final velocity ($V_F$), which according to the example of FIG. 6 is a predetermined final rotational velocity of 7200 revolutions/second, the servo control system 150 moves the read/write head 118 from the landing zone 120 to a data region 304 on the disc 108 in accordance with an embodiment of the present invention. Although the multi-phase acceleration procedure is shown in and illustrated in FIG. 6 as applying four acceleration rates (602, 604, 606 and 608) to the disc 108 to achieve a final rotational velocity by the disc 108, and thus a final rotational velocity ($V_F$) being derived at the termination of the fourth acceleration rate 608, it should be appreciated that the multi-phase acceleration procedure may use only two acceleration rates, with the final rotational velocity ($V_F$) of the disc 108 being realized at the termination of the second of the two acceleration rates. Equally important, the multi-phase acceleration procedure may also apply any number of acceleration rates to the disc 108 to achieve the final rotational velocity ($V_F$), so long as at least 2 acceleration rates are used.

The final rotational velocity ($V_F$) is preferably defined as a velocity sufficient to create and maintain an air bearing between the slider of the read/write head 118 and the surface of the disc 108 as the head 118 accesses the surface of the disc 108 between the ID 136 and the OD 138. Because the final rotational velocity ($V_F$) occurs at a predetermined time ($T_F$) following a predetermined number of acceleration rates, movement of the head 118 from the landing 120 to a data region 304 between the ID 136 and the OD 138 may be triggered based on either a velocity parameter ($V_F$) or a timing parameter ($T_F$) in accordance with various embodiments of the present invention.

In accordance with an alternative embodiment implementing the "early exit technique," the read/write head 118 may exit the landing zone 120 at a time prior to the rotational velocity of the disc 108 reaching the final velocity ($V_F$). In disc drives 100 implementing the early exit technique the servo control system 150 moves the read/write head 118 from the landing zone 120 to a data region 304 on the disc 108 at a desired early exit velocity ($V_D$). Because the early exit velocity ($V_D$) occurs at a predetermined time ($T_D$) following a predetermined number of acceleration rates, movement of the head 118 from the landing 120 to a data region 304 between the ID 136 and the OD 138 may be triggered based on a velocity parameter ($V_D$) or a timing parameter ($T_D$), which may be referred to as an early exit time. The early exit velocity ($V_D$) may preferably be a velocity sufficient to create an air bearing between the slider on the read/write head 118 and the surface of the disc 108 as the head 118 is located in close proximity to the ID 136.

Figure 7:
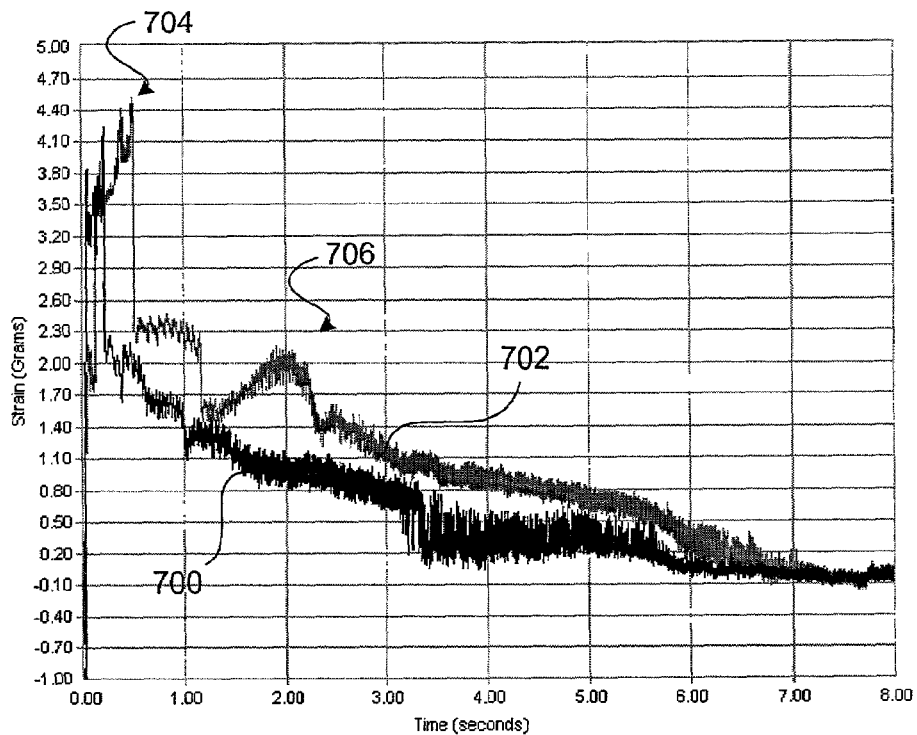
FIG. 7 is a graphical representation of friction force evolution as rotational velocity of a disc is increased from an initial velocity to a final rotational velocity at a constant acceleration, such as the constant acceleration depicted in FIG. 5, and at multiple phases of acceleration in accordance with an embodiment of the present invention.

Referring to FIG. 7, a graphical representation of friction force evolution as rotational velocity of a disc 108 is increased from an initial velocity ($V_i$) of 0 revolutions/second to a final rotational velocity ($V_F$). More specifically, FIG. 7 shows two graphical representations illustrating friction forces over time as rotational velocity of a disc 108 increases both at a constant acceleration (plot 702) and at multiple acceleration phases (plot 700). Friction forces associated with a SLIP interface as rotational velocity of a disc 108 increases from zero velocity ($V_i$) to the final rotational velocity ($V_F$) at multiple acceleration phases in accordance with an embodiment of the present invention is shown by a first SLIP plot 700. Likewise, friction forces associated with a SLIP interface as the rotational velocity of a disc 108 increases from zero velocity ($V_i$) to the final rotational velocity ($V_F$) at a constant acceleration is shown by a second SLIP plot 702.

With respect to both the first SLIP plot 700 and the second SLIP plot 702, friction forces are measured between an initial time ($T_i$) and a final time ($T_F$), wherein the initial time ($T_i$) represents the beginning of disc rotation and the final time ($T_F$) represents a desired time at which the rotational velocity of the disc 108 reaches a final rotational velocity ($V_F$) sufficient to maintain an air bearing between the slider of the head 118 and the surface of the disc 108 as the head 118 moves toward the OD 138. As an example, and not a means of limitation, the time ($T_F$) for the disc 108 to reach the final rotational velocity ($V_F$) is described and shown in FIG. 7 as 8 seconds. Thus, the initial time ($T_i$) is 0 seconds and the final time ($T_F$) is 8 seconds. However, it should be appreciated that predetermined constraints and parameters, such as the final rotational velocity ($V_F$) and the time ($T_F$) for a disc to reach final rotational velocity ($V_F$), may be defined to be any value or range of values, depending on any number of factors, including, but not limited to, disc drive design and operating specifications.

Referring to FIG. 7, the second SLIP plot 702 shows that, for a padded slider-smooth disc configuration, after a first phase 704 of rapid increase and decrease of friction forces, a second phase 706 occurs where the friction forces first increase then decrease slowly. This second phase is primarily due to contact of the trailing edge of the slider when the pitch angle is increased because of the increasing rotational velocity of the disc 108. As shown by the first SLIP plot 700, by applying multiple acceleration phases to the disc 108 between an initial time ($T_i$) and a final time ($T_F$), the second phase of friction forces between the slider of the head 118 and the surface of the landing zone 120 is eliminated. Furthermore, applying multiple acceleration phases to the rotating disc 108 results in a shorter time period at which friction forces are realized between the slider and the landing zone 120 surface, as shown by the difference in the first phase 704 of friction forces between the two plots 700 and 702. Whereas the forces shown by the first SLIP plot 700 decrease from approximately 4.2 grams to approximately 2 grams after 0.25 seconds, the forces shown by the second SLIP plot 702 remain at approximately 4 grams until approximately 0.6 seconds. Although not shown, application of multiple acceleration phases to a disc 108 from an initial rotational velocity ($V_i$) of zero revolutions/second to a final rotational velocity ($V_F$) in disc drives 100 utilizing an LAP and an LZT interface eliminates any potential second phases of friction force and reduces the length in time that friction forces are realized between the slider and the disc surface in a manner substantially similar to that described in FIG. 7.

In accordance with an embodiment, the present invention may be implemented as a computer-readable program storage device which tangibly embodies a program of instructions executable by a computer system to accelerate a data storage disc 108 at multiple acceleration rates to attain a final rotational velocity ($V_F$) of the rotating disc 108. As such, the logical operations of the various embodiments of the present invention may be implemented (1) as a sequence of computer implemented acts or program modules running on a computing system and or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 8:
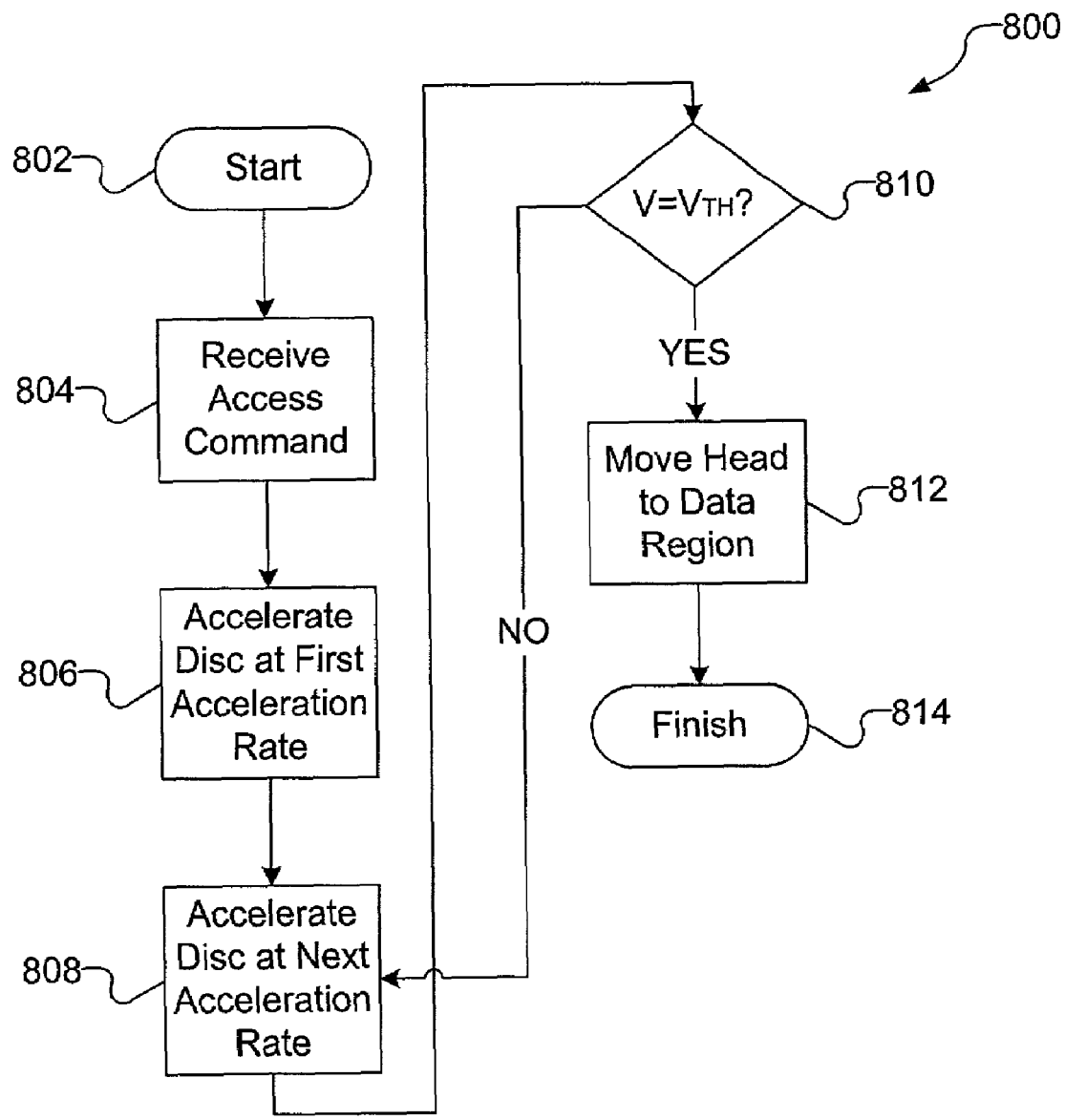
FIG. 8 is a flow diagram that illustrates operational characteristics of a multi-phase acceleration procedure in accordance with an embodiment of the present invention.

FIG. 8 illustrates operations associated with a multi-phase acceleration procedure 800 for rotating a disc 108 from an initial rotational velocity ($V_i$) to a threshold velocity ($V_{TH}$). Specifically, the multi-phase acceleration procedure 800 applies multiple acceleration steps, rates or phases to a disc 108 to initiate rotation by the disc 108 at an initial time ($T_i$) and set the rotational velocity of the disc 108 at a predetermined threshold rotational velocity ($V_{TH}$) from an initial rotational velocity of zero revolutions/second in accordance with an embodiment of the present invention. The multi-phase acceleration procedure 800 preferably accelerates the disc 108 at multiple acceleration rates such that the threshold rotational velocity ($V_{TH}$) is realized at a predetermined threshold time ($T_{TH}$). In accordance with an embodiment, the threshold velocity ($V_{TH}$) is a velocity sufficient to create an air bearing between a read/write head 118 and a surface of the disc 108 as the head 118 exits a landing zone 120 and enters a data region 304 on the surface of the disc 108. As such, the threshold velocity ($V_{TH}$) may be a final velocity ($V_F$) in accordance with one embodiment of the present invention or a desired early exit velocity ($V_D$) in accordance with an alternative embodiment of the present invention. As shown in more detail in FIG. 9, if the threshold velocity ($V_{TH}$) is a final velocity ($V_F$), the threshold velocity ($V_{TH}$) is a velocity sufficient to create and maintain the air bearing as the head 118 radially traverses across the disc 108 toward the outer diameter 138. Thus, the multi-phase acceleration procedure shown and illustrated in FIG. 10 describes continuing acceleration of the disc 108 past the threshold velocity ($V_{TH}$) to obtain $V_F$.

The multi-phase acceleration procedure 800 comprises an operation flow beginning with a start operation 802 and concluding with a termination operation 814. Specifically, the multi-phase acceleration procedure 800 is initiated at the start operation 802 as a computer microprocessor 142 transmits a read/write instruction to a servo control system 150 and a spindle control module 148. The read/write instruction directs the spindle control module 148 to begin spinning one or more discs 108 to which data is to be written to or read from a read/write head 118 controlled by the servo control system 150. For simplicity, the multi-phase acceleration procedure 800 is described below with reference to a single disc 108 of a disc drive 100.

Operation flow passes from the start operation 802 to a receive operation 804. The receive operation 804 receives the read/write instruction issued by the microprocessor 142. After the read/write instruction is received, operation flow passes to an initial accelerate operation 806. The initial accelerate operation 806 accelerates the disc 108 at an initial acceleration rate from an initial rotational velocity ($V_i$), which in accordance with an embodiment is zero revolutions/second, until the disc 108 reaches a first rotational velocity ($V_1$). As the disc 108 reaches the first rotational velocity ($V_1$), operation flow passes to a next accelerate operation 808. The next accelerate operation 808 accelerates the disc 108 at a second acceleration rate until the disc 108 reaches a second rotational velocity ($V_N$). As the disc 108 reaches the second rotational velocity ($V_N$), operation flow passes to a velocity determine operation 810. The velocity determine operation 810 determines whether the current rotational velocity of the disc 108 has reached the threshold rotational velocity ($V_{TH}$). The threshold rotational velocity ($V_{TH}$) may be defined to be any value or range of values depending on any number of factors, including, but not limited to, disc drive design and operating specifications.

If the velocity determine operation 810 determines that the current rotational velocity is the desired final rotational velocity ($V_F$), operation flow passes to a head exit operation 812. The head exit operation 812 moves the read/write head 118 from a landing zone 120 to a data region 304 on the surface of the disc 108 such that the head 118 may access, i.e., write to or read from, tracks 306 on the disc 108. As described above and in more detail below, the head 118 may exit the landing zone 120 at either a final velocity ($V_F$) or a desired early exit velocity ($V_D$). As such, the tracks 306 on the disc 108 accessible by the head 118 depend on whether the head 118 exits the landing zone 120 at a final rotational velocity ($V_F$) or an early exit velocity ($V_D$).

If the velocity determine operation 810 determines that the current rotational velocity is not the predetermined threshold velocity ($V_{TH}$), operation flow passes back to the next accelerate operation 808. The disc 108 is then accelerated at an acceleration rate different from the previous acceleration rate applied by next accelerate operation 808 and operation flow continues passing between the next accelerate operation 808 and the velocity determine operation 810 until the threshold rotational velocity ($V_{TH}$) is realized. After the read/write head 118 is moved from the landing zone 120, operation flow concludes at the termination operation 814.

Figure 9:
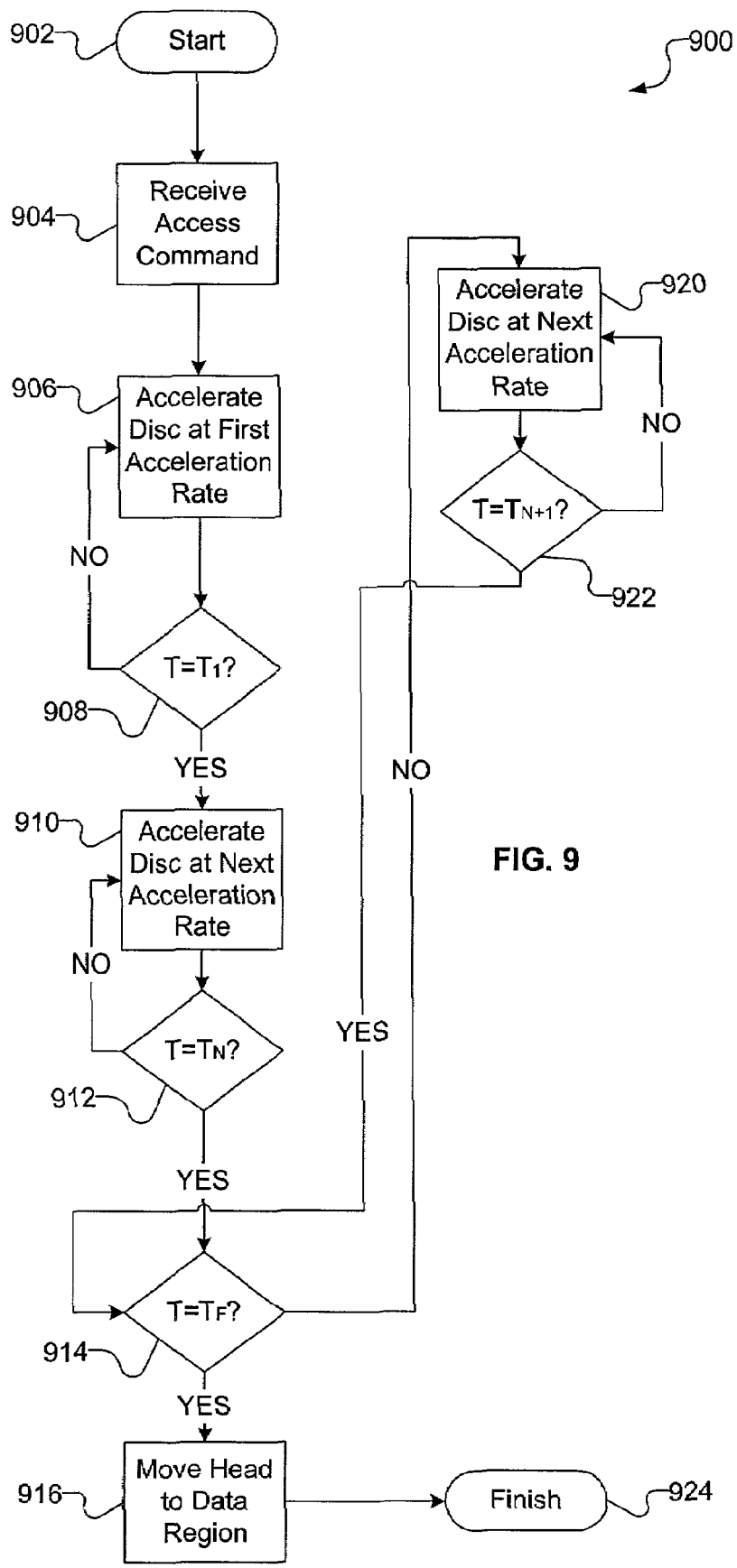
FIG. 9 is a flow diagram that illustrates operational characteristics shown in FIG. 8 in more detail in accordance with an embodiment of the present invention.

FIG. 9 illustrates operations associated with a multi-phase acceleration procedure 900 for rotating a disc 108 from an initial rotational velocity ($V_i$) to a final rotational velocity ($V_F$) over a predetermined time period ($T_F - T_i$) in accordance with an embodiment of the present invention. Specifically, the multi-phase acceleration procedure 900 applies multiple acceleration steps, rates or phases to a disc 108 to initiate rotation by the disc 108 at an initial time ($T_i$) and set the rotational velocity of the disc 108 at a predetermined final velocity ($V_F$). Thus, the threshold velocity ($V_{TH}$) described in FIG. 9 is a predetermined final velocity ($V_F$). The multi-phase acceleration procedure 900 preferably accelerates the disc 108 at multiple acceleration rates such that the final rotational velocity ($V_F$) is realized at a predetermined final time ($T_F$). The rotational velocity of the disc 108 is preferably 0 revolutions/second at the initial time ($T_i$). Predetermined constraints and parameters, such as the initial rotational velocity ($V_i$), and the time ($T_i$) at which disc rotation is initiated, the final rotational velocity ($V_F$) and the time ($T_F$) at which the disc 108 reaches final rotational velocity ($V_F$), may be defined to be any value or range of values, depending on any number of factors, including, but not limited to, disc drive design and operating specifications.

The multi-phase acceleration procedure 900 comprises an operation flow beginning with a start operation 902 and concluding with a termination operation 924. Specifically, the multi-phase acceleration procedure 900 is initiated at the start operation 902 as a computer microprocessor 142 transmits a read/write instruction to a servo control system 150 and a spindle control module 148. The read/write instruction directs the spindle control module 148 to begin spinning one or more discs 108 to which data is to be written to or read from a read/write head 118 controlled by the servo control system 150. For simplicity, the multi-phase acceleration procedure 900 is described below with reference to a single disc 108 of a disc drive 100.

Operation flow passes from the start operation 902 to a receive operation 904. The receive operation 904 receives the read/write instruction issued by the microprocessor 142. After the read/write instruction is received, operation flow passes to an initial accelerate operation 906. The initial accelerate operation 906 accelerates the disc 108 at an initial acceleration rate from an initial rotational velocity ($V_i$), which in accordance with an embodiment is zero revolutions/second, until the disc 108 reaches a first rotational velocity ($V_1$). In accordance with an embodiment of the present invention, the disc 108 reaches the first rotational velocity ($V_1$) following an initial predetermined time period following the initial time ($T_i$). The initial predetermined time period preferably ends at time $T_1$. As such, operation flow passes from the initial accelerate operation 906 to a first query operation 908. The first query operation 908 determines whether the disc 108 has been rotating for the initial predetermined time period by comparing the current time of disc rotation to time $T_1$. If the current time does not equal time $T_1$, operation flow passes back to the initial accelerate operation 906 and rotation of the disc 108 is continued at the initial acceleration rate until time $T_1$. At time $T_1$, operation flow passes to a next accelerate operation 910.

The next accelerate operation 910 accelerates the disc 108 at a second acceleration rate different from the initial acceleration rate until the disc 108 reaches a next rotational velocity ($V_N$). In accordance with an embodiment of the present invention, the disc 108 reaches the next rotational velocity ($V_N$) following a second predetermined time period beginning at time $T_1$ and ending at a time $T_N$. As such, operation flow passes from the next accelerate operation 910 to a second query operation 912. The second query operation 912 determines whether the disc 108 has been rotating for the second predetermined time period by comparing the current time of disc rotation to time $T_N$. If the current time does not equal time $T_N$, operation flow passes back to the next accelerate operation 910 and rotation of the disc 108 is continued at the second acceleration rate until time $T_N$. At time $T_N$, operation flow passes to a third query operation 914.

The third query operation 914 determines whether the current rotational velocity of the disc 108 has reached a predetermined final rotational velocity ($V_F$) by comparing the length of the current time period of disc rotation from the initial velocity ($V_i$) to a predetermined final time period. The predetermined final time period preferably ends at time $T_F$. In accordance with an embodiment of the present invention, the time $T_F$ may be predetermined as a time at which the rotational velocity of the disc 108 is sufficient to create and maintain an air bearing between the slider of the read/write head 118 and the surface of the disc 108 as the head 118 accesses the surface of the disc 108 between the ID 136 and the OD 138. Moreover, the final rotational velocity ($V_F$) and time $T_F$ may be defined to be any value or range of values depending on any number of factors, including, but not limited to, disc drive design and operating specifications.

If the third query operation 914 determines that the length of the current time period equals the predetermined final time period, operation flow passes to a head exit operation 916. The head exit operation 916 moves the read/write head 118 from a landing zone 120 to a data region 304 on the surface of the disc 108 such that the head 118 may access, i.e. write to or read from, tracks 306 on the disc 108. Once the head 118 is moved to a data region 304, operation flow concludes with a terminate operation 924. If, however, the third query operation 914 determines that the length of the current time period does not equal the predetermined final time period, operation flow passes to a subsequent accelerate operation 920. The subsequent accelerate operation 920 accelerates the disc 108 at a third acceleration rate different from the second acceleration rate applied by the next accelerate operation 910. Subsequent accelerate operation 920 accelerates the disc 108 until the disc 108 reaches a next rotational velocity ($V_{N+1}$). In accordance with an embodiment of the present invention, the disc 108 reaches the next rotational velocity ($V_{N+1}$) following a third predetermined time period beginning at time $T_N$ and ending at a time $T_{N+1}$. As such, operation flow passes from the subsequent accelerate operation 920 to a fourth query operation 922.

The fourth query operation 922 determines whether the current time is time $T_{N+1}$. If the current time is not time $T_{N+1}$, operation flow passes back to the subsequent accelerate operation 920 and rotation of the disc 108 is continued at the third acceleration rate until time $T_{N+1}$. At time $T_{N+1}$, operation flow passes to the third query operation 914 and continues to the head exit operation 916 if the current time equals time $T_F$. If, however, the disc 108 has not been rotating for the final predetermined time period ending at time $T_F$, operation flow passes back to the subsequent accelerate operation 920 and continues as previously described. Each instance that operation flow passes to subsequent accelerate operation 920 from the third query operation 914, the subsequent accelerate operation 920 accelerates the disc 108 at an acceleration rate different from the previously applied acceleration rate. As such, the subsequent accelerate operation 920 may accelerate the disc 108 at a third, fourth, fifth, sixth, etc . . . acceleration rate, with each acceleration rate being different in magnitude than the previous acceleration rate, e.g., the fifth acceleration rate is preferably different than the fourth acceleration rate, but the sixth acceleration rate may be the same magnitude as the third acceleration rate. For clarity and operational flow purposes, the acceleration rate applied by the subsequent acceleration operation 920 is hereafter referred to as a "next acceleration rate" in order to distinguish the rate from the acceleration rates applied by the operation 920 on previous operation flow passes. Operation flow continues passing between the subsequent accelerate operation 920, the fourth query operation 922 and the third query operation 914 until the third query operation 914 determines that the disc 108 has been rotating for the predetermined final time period ending at time $T_F$, at which time, operation flow passes to the head exit operation. 916 and continues as described above.

Figure 10:
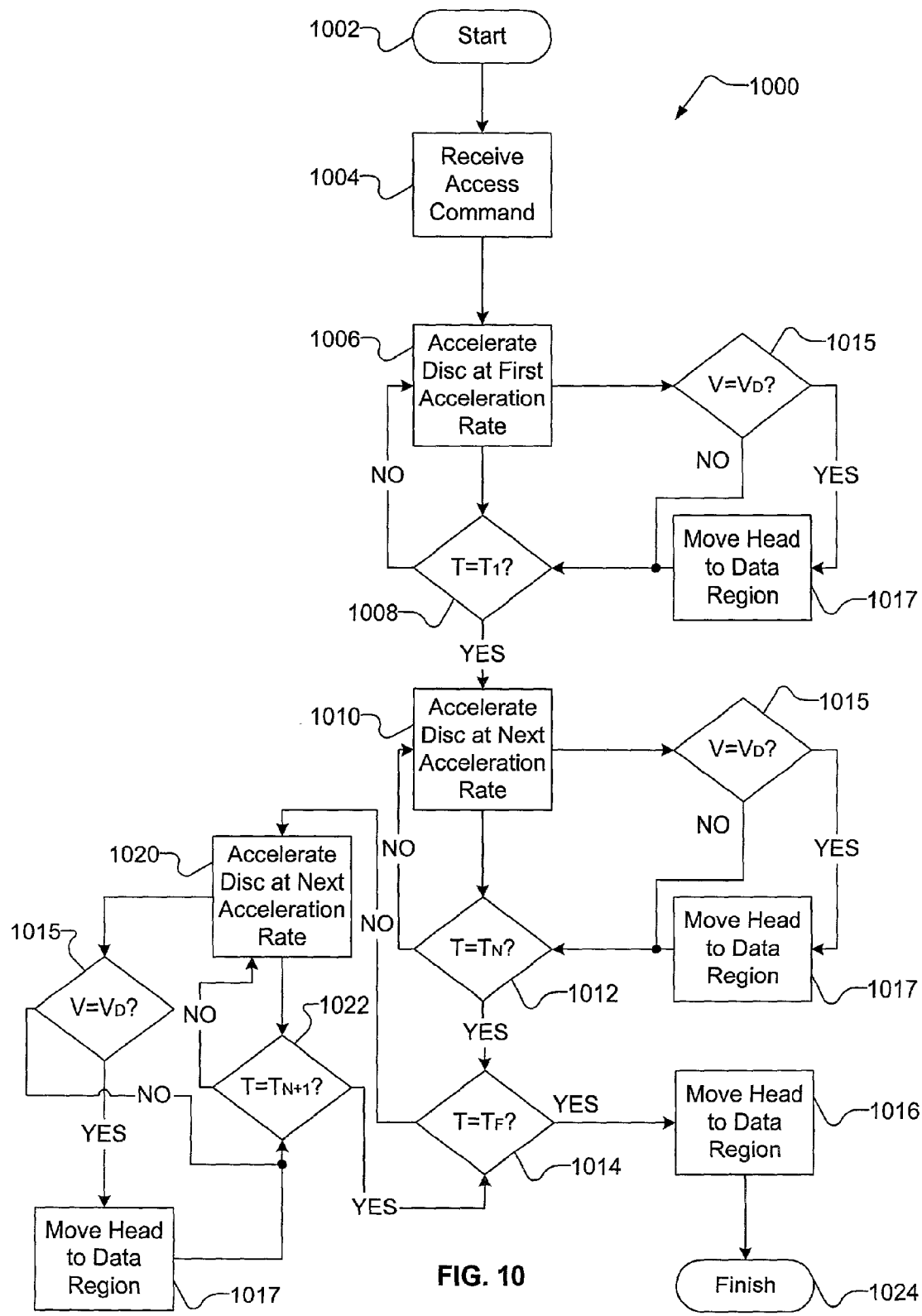
FIG. 10 is a flow diagram that illustrates operational characteristics of a multi-phase acceleration procedure utilizing an early exit technique for accessing tracks on a data storage disc in accordance with an alternative embodiment of the present invention.

FIG. 10 illustrates operations associated with a multi-phase acceleration procedure 1000 for rotating a disc 108 from an initial rotational velocity ($V_i$) to a final rotational velocity ($V_F$) over a predetermined time period ($T_i$-$T_F$) in accordance with an alternative embodiment of the present invention. The multi-phase acceleration procedure 1000 applies multiple acceleration steps, rates, stages or phases to a disc 108 to initiate rotation by the disc 108 at an initial time ($T_i$) and set the rotational velocity of the disc 108 at a predetermined final rotational velocity ($V_F$). The multi-phase acceleration procedure 1000 preferably accelerates the disc 108 at multiple acceleration rates such that final rotational velocity ($V_F$) is realized at a predetermined final time ($T_F$). The rotational velocity of the disc 108 is preferably zero revolutions/second at the initial time ($T_i$). The multi-phase acceleration procedure 1000 is a multi-phase acceleration procedure, such as the procedure 900 in FIG. 9, incorporating operations associated with an early exit technique moving a read/write head 118 from a landing zone 120 to a data region 304 on the disc 108 at a desired early exit velocity ($V_D$). Thus, the threshold velocity ($V_{TH}$) described in FIG. 10 is a desired early exit velocity ($V_D$). Predetermined constraints and parameters, such as the desired early exit velocity ($V_D$), the final rotational velocity ($V_F$) of the disc 108 and the time ($T_F$) at which the disc 108 reaches both the desired early exit velocity ($V_D$) and final rotational velocity ($V_F$), may be defined to be any value or range of values, depending on any number of factors, including, but not limited to, disc drive design and operating specifications.

The multi-phase acceleration procedure 1000 comprises an operation flow beginning with a start operation 1002 and concluding with a termination operation 1024. Specifically, the multi-phase acceleration procedure 1000 is initiated at the start operation 1002 as a computer microprocessor 142 transmits a read/write instruction to a servo control system 150 and a spindle control module 148. The read/write instruction directs the spindle control module 148 to begin spinning one or more discs 108 to which data is to be written to or read from by a read/write head 118 controlled by the servo control system 150. For simplicity, the multi-phase acceleration procedure 1000 is described below with reference to a single disc 108 of a disc drive 100.

Operation flow passes from the start operation 1002 to a receive operation 1004. The receive operation 1004 receives the read/write instruction issued by the microprocessor 142. After the read/write instruction is received, operation flow passes to an initial accelerate operation 1006. The initial accelerate operation 1006 accelerates the disc 108 at an initial acceleration rate from an initial rotational velocity ($V_i$), which in accordance with an embodiment is zero revolutions/second, until the disc 108 reaches a first rotational velocity ($V_1$). In accordance with an embodiment of the present invention, the disc 108 reaches the first rotational velocity ($V_1$) following an initial predetermined time period following the initial time ($T_i$). The initial predetermined time period preferably ends at time $T_1$. Operation flow simultaneously passes from the initial accelerate operation 1006 to a first query operation 1008 and a velocity query operation 1015. The first query operation 1008 determines whether the disc 108 has been rotating for the initial predetermined time period by comparing the current time of disc rotation to time $T_1$. If the current time does not equal time $T_1$, operation flow passes back to the initial accelerate operation 1004 and rotation of the disc 108 is continued at the initial acceleration rate until time $T_1$.

The velocity query operation 1015 determines whether the rotational velocity of the disc 108 has reached the desired early exit velocity ($V_D$). If the velocity query operation 1015 determines that the early exit velocity ($V_D$) has been reached, operation flow passes to an early exit operation 1017. The early exit operation 1017 moves the read/write head 118 from a landing zone 120 to a data region 304 on the surface of the disc 108 such that the head 118 may access, i.e. write to or read from, tracks 306 on the disc 108. Operation flow then continues to the query operation 1008 and continues passing between the query operation 1008 and the initial accelerate operation 1006 until time $T_1$.

If, however, the velocity query operation 1015 determines that the early exit velocity ($V_D$) has not been reached, operation flow passes to the first query operation 1008 without passing to the early exit operation 1017 and continues passing between the initial accelerate operation 1006, the first query operation 1008 and the velocity query operation 1015 until time $T_1$. Regardless of whether the head 118 has been moved from the landing zone 120 to the data region 304, at time $T_1$ operation flow passes to a next accelerate operation 1010.

The next accelerate operation 1010 accelerates the disc 108 at a second acceleration rate different from the initial acceleration rate until the disc 108 reaches a next rotational velocity ($V_N$). In accordance with an embodiment of the present invention, the disc 108 reaches the next rotational velocity ($V_N$) following a second predetermined time period beginning at time $T_1$, and ending the time $T_N$. Operation flow simultaneously passes from the next accelerate operation 1010 to a second query operation 1012 and the velocity query operation 1015. The second query operation 1012 determines whether the disc 108 has been rotating for the second predetermined time period by comparing the current time of disc rotation to time $T_N$. If the current time does not equal time $T_N$, operation flow passes back to the next accelerate operation 1010 and rotation of the disc 108 is continued at the second acceleration rate until time $T_1$.

The velocity query operation 1015 determines whether the rotational velocity of the disc 108 has reached the desired early exit velocity ($V_D$). If the velocity query operation 1015 determines that the early exit velocity ($V_D$) has been reached, operation flow passes to the early exit operation 1017. As described above, the early exit operation 1017 moves the read/write head 118 from a landing zone 120 to a data region 304 on the surface of the disc 108 such that the head 118 may access, i.e. write to or read from, tracks 306 on the disc 108. Operation flow then continues to the second query operation 1012 and continues passing between the second query operation 1012 and the next accelerate operation 1010 until time $T_N$.

If, however, the velocity query operation 1015 determines that the early exit velocity ($V_D$) has not been reached, operation flow passes to the second query operation 1012 without passing to the early exit operation 1017 and continues passing between the next accelerate operation 1010, the second query operation 1012 and the velocity query operation 1015 until time ($T_N$). Regardless of whether the head 118 has been moved from the landing zone 120 to the data region 304, at time $T_N$ operation flow passes to a third query operation 1014.

The third query operation 1014 determines whether the current rotational velocity of the disc 108 has reached the final rotational velocity ($V_F$) by comparing the length of the current time period of disc rotation from the initial velocity to a predetermined final time period ending at time $T_F$. In accordance with an embodiment of the present invention, the time $T_F$ may be predetermined as a time at which the rotational velocity of the disc 108 is sufficient to create and maintain an air bearing between the slider of the read/write head 118 and the surface of the disc 108 as the head 118 accesses the surface of the disc 108 between the ID 136 and the OD 138. Moreover, the final rotational velocity ($V_F$) and time $T_F$ may be defined to be any value or range of values depending on any number of factors, including, but not limited to, disc drive design and operating specifications.

If the third query operation 1014 determines that the length of the current time period equals the predetermined final time period, operation flow passes to a head exit operation 1016. The head exit operation 1016 moves the read/write head 118 from a landing zone 120 to a data region 304 on the surface of the disc 108 such that the head 118 may access, i.e. write to or read from, tracks 306 on the disc 108. Because the disc 108 is spinning at the final rotational velocity ($V_F$) at time $T_F$, the air bearing is maintained between the head 118 and any location between the ID 136 and the OD 138 on the disc 108. Once the head 118 is moved to a data region 304, operation flow concludes with a terminate operation 1024.

If, however, the third query operation 1014 determines that the length of the current time period does not equal the predetermined final time period ($T_F$), operation flow passes to a subsequent accelerate operation 1020. The subsequent accelerate operation 1020 accelerates the disc 108 at a third acceleration rate different from the second acceleration rate applied by next accelerate operation 1010. The subsequent accelerate operation 1020 accelerates the disc 108 until the disc 108 reaches a next rotational velocity ($V_{N+1}$). In accordance with an embodiment of the present invention, the disc 108 reaches the next rotational velocity ($V_{N+1}$) following a third predetermined time period beginning at time $T_N$ and ending at a time $T_{N+1}$. Operation flow simultaneously passes from the subsequent accelerate operation 1020 to a fourth query operation 1022 and the velocity query operation 1015. The fourth query operation 1022 determines whether the disc 108 has been rotating for the third predetermined time period by comparing the current time of disc rotation to time $T_{N+1}$. If the current time does not equal time $T_{N+1}$, operation flow passes back to the subsequent accelerate operation 1020 and rotation of the disc 108 is continued at the third acceleration rate until time $T_{N+1}$.

The velocity query operation 1015 determines whether the rotational velocity of the disc 108 has reached the desired early exit velocity ($V_D$). If velocity query operation 1015 determines that the early exit velocity $V_D$ has been reached, operation flow passes to the early exit operation 1017. As described above, the early exit operation 1017 moves the read/write head 118 from a landing zone 120 to a data region 304 on the surface of the disc 108 such that the head 118 may access, i.e. write to or read from, tracks 306 on the disc 108. Operation flow then continues to the fourth query operation 1022 and continues passing between the fourth query operation 1022 and the subsequent accelerate operation 1020 until time $T_{N+1}$.

If, however, the velocity query operation 1015 determines that the early exit velocity ($V_D$) has not been reached, operation flow passes to the fourth query operation 1022 without passing to early exit operation 1017 and continues passing between the subsequent accelerate operation 1020, the fourth query operation 1022 and the velocity query operation 1015 until time $T_{N+1}$. Regardless of whether the head 118 has been moved from the landing zone 120 to the data region 304, at time $T_{N+1}$ operation flow passes to the third query operation 1014.

At time $T_{N+1}$, operation flow passes to the third query operation 1014 and continues to the head exit operation 1016 if the length of the current time period equals the predetermined final time period ending at time $T_F$. If, however, the disc 108 has not been rotating for the final predetermined time period ending at time $T_F$, operation flow passes back to the subsequent accelerate operation 1020 and continues as previously described. Each instance that operation flow passes to the subsequent accelerate operation 1020 from the third query operation 1014, the subsequent accelerate operation 1020 accelerates the disc 108 at an acceleration rate different from the previously applied acceleration rate. As such, the subsequent accelerate operation 1020 may accelerate the disc 108 at a third, fourth, fifth, sixth, etc. . . . acceleration rate, with each acceleration rate being different in magnitude than the previous acceleration rate, e.g., the fifth acceleration rate is preferably different than the fourth acceleration rate, but the sixth acceleration rate may be the same magnitude as the third acceleration rate. For clarity and operational flow purposes, the acceleration rate applied by the subsequent acceleration operation 1020 is hereafter referred to as a "next acceleration rate" in order to distinguish the rate from the acceleration rates applied by the operation 1020 on previous operation flow passes. Operation flow continues passing between the subsequent accelerate operation 1020, the velocity query operation 1015, the fourth query operation 1022 and the third query operation 1014 until the third query operation 1014 determines that the disc 108 has been rotating for the predetermined final time period ending at time $T_F$, at which time, operation flow passes to the head exit operation 1016 and continues as described above.

In summary, the present invention may be viewed as a method (such as in operation 800) for increasing rotational velocity of a data storage disc (such as 108) in a disc drive (such as 100). The method (such as in operation 800) includes steps of accelerating (such as in operation 806) the data storage disc (such as 108) at a first acceleration rate from an initial rotational velocity to a first predetermined rotational velocity, accelerating (such as in operation 808) the data storage disc (such as 108) at a second acceleration rate from the first predetermined rotational velocity to a threshold rotational velocity, and, as the data storage disc (such as 108) rotates at the threshold rotational velocity, moving (such as in operation 812) a transducer (such as 118) from a landing zone (such as 120) to a data region (such as 304) on a surface of the data storage disc (such as 108). The threshold rotational velocity creates and maintains an air bearing between the transducer (such as 118) and the surface of the disc (such as 108).

In accordance with an embodiment, the threshold rotational velocity may be a final to rotational velocity creating and maintaining the air bearing as the transducer (such as 118) radially traverses across the disc (such as 108) between an inner diameter (such as 136) and an outer diameter (such as 138). As such, the accelerating step (such as in operation 808) may include steps of accelerating (such as in operation 910) the data storage disc (such as 108) at the second acceleration rate from the first predetermined rotational velocity to a second predetermined rotational velocity and accelerating (such as in operation 920) the data storage disc (such as 108) at one or more next acceleration rates from the second predetermined rotational velocity to the threshold rotational velocity if the second predetermined rotational velocity does not equal the threshold rotational velocity. The accelerating step (such as in operation 806) may include accelerating the data storage disc (such as 108) at the first acceleration rate between an initial time corresponding to when the rotational velocity of the disc (such as 108) equals the initial rotational velocity and a first predetermined time corresponding to when the rotational velocity of the disc (such as 108) reaches the first predetermined rotational velocity. Likewise, the accelerating step (such as in operation 806) may include accelerating the data storage disc (such as 108) at the second acceleration rate between the first predetermined time and a threshold time corresponding to when the rotational velocity of the disc (such as 108) reaches the threshold rotational velocity. As such, the moving step (such as in operation 812) may include a step of displacing the transducer (such as 118) from the landing zone (such as 120) at the threshold time.

In accordance with an alternative embodiment, the threshold rotational velocity may be an early exit velocity creating the air bearing as the transducer (such as 118) exits the landing zone (such as 120) and accesses the data region (such as 304). As such, the method (such as in operation 800) may include a step of accelerating (such as in operation 1010 or 1020) the data storage disc (such as 108) at a third acceleration rate from the threshold rotational velocity to a final rotational velocity. The final rotational velocity maintains the air bearing as the transducer (such as 118) radially traverses toward an outer diameter (such as 138) of the data storage disc (such as 108). The accelerating step (such as in operation 806) may include accelerating (such as in operation 1006) the data storage disc (such as 108) at the first acceleration rate between an initial time corresponding to when the rotational velocity of the disc (such as 108) equals the initial rotational velocity and a first predetermined time corresponding to when the rotational velocity of the disc (such as 108) reaches the first predetermined rotational velocity. Likewise, the accelerating step (such as in operation 808) may include accelerating (such as in operation 1010) the data storage disc (such as 108) at the second acceleration rate between the first predetermined time and a threshold time corresponding to when the rotational velocity of the disc (such as 108) reaches the threshold rotational velocity. As such, the moving step (such as in operation 812) may include a step of displacing (such as in operations 1016 or 1017) the transducer (such as 118) from the landing zone (such as 120) at the threshold time. Furthermore, the accelerating step (such as in operation 1010 or 1020) may include a step of accelerating the data storage disc (such as 108) at the final acceleration rate between the threshold time and a final predetermined time corresponding to when the rotational velocity of the disc (such as 108) reaches the final rotational velocity.

In accordance with other embodiments, the accelerating step (such as in operation 800) may include steps of accelerating (such as in operation 1010) the data storage disc (such as 108) at the second acceleration rate from the first predetermined rotational velocity to a second predetermined rotational velocity and accelerating (such as in operation 1020) the data storage disc (such as 108) at one or more next acceleration rates from the second predetermined rotational velocity to the threshold rotational velocity if the second predetermined rotational velocity does not equal the threshold rotational velocity. Furthermore, the accelerating step (such as in operations 1010 or 1020) may include steps of accelerating (such as in operation 1010 or 1020) the data storage disc (such as 108) at the third acceleration rate from the threshold rotational velocity to a second predetermined rotational velocity and accelerating (such as in operation 1010 or 1020) the data storage disc (such as 108) at one or more next acceleration rates from the second predetermined rotational velocity to the final rotational velocity if the second predetermined rotational velocity does not equal the threshold rotational velocity.

The present invention may also be viewed as a program storage device readable by computer tangibly embodying a program of instructions executable by the computer system to perform a method (such as in operation 800) for increasing rotational velocity of a data storage disc (such as 108) in a disc drive (such as 100).

The present invention may also be viewed as a disc drive (such as 100) having a data storage disc (such as 108) rotably mounted to a base plate (such as 102) and operable to spin at a rotational velocity and an actuator arm (such as 114) mounted on the base plate (such as 102) adjacent the disc (such as 108). The disc drive (such as 100) includes a transducer (such as 118) attached to the actuator arm (such as 114) such that the transducer (such as 118) is operable to move over a surface of the disc (such as 108). The transducer (such as 118) is preferably parked on a landing zone (such as 120) on the surface of the disc (such as 108). The disc drive (such as 100) also includes a means (such as 806 and 808) for accelerating the data storage disc (such as 108) at multiple acceleration rates from an initial rotational velocity to a threshold rotational velocity and means (such as 812) for moving the transducer (such as 118) from the landing zone (such as 120) to a data region (such as 304) on the disc (such as 108) at the threshold rotational velocity. The threshold rotational velocity may be a final rotational velocity creating and maintaining an air bearing between the transducer (such as 118) and the surface of the disc (such as 108) as the transducer (such as 118) radially traverses across the disc (such as 108) between an inner diameter (such as 136) and an outer diameter (such as 138) in accordance with an embodiment of the invention. The threshold rotational velocity may also be an early exit velocity creating an air bearing between the transducer (such as 118) and the surface of the disc (such as 108) as the transducer (such as 118) exits the landing zone (such as 120) and accesses the data region (such as 304) in accordance with an alternative embodiment of the invention.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the multi-phase acceleration procedure may be used to retract a read/write head from a data region to a landing zone or a load/unload ramp during disc drive power down. Furthermore, the multi-phase acceleration procedure may apply only two varied acceleration steps to the disc, with the second stage remaining a constant acceleration until the final rotational velocity is attained in the rotational velocity of the disc. Additionally, the read/write head may exit a landing zone at a predetermined time corresponding to a desired early exit velocity. As such, determination of whether the head is to leave the landing zone may be based upon this

What is claimed is:

1. A meted comprising steps of:
   (a) accelerating a medium at a first acceleration rate to a first velocity;
   (b) subsequently accelerating the medium at a second acceleration rate different than the first acceleration to a second velocity different than the first velocity.

2. A method as defined in claim 1, further comprising moving a transducer adjacent the medium from a parked position responsively to a one of the accelerating steps (a) and (b).

3. A method as defined in claim 2 wherein the second velocity is a target velocity, further comprising the step of accelerating the medium at at least one more acceleration rates between accelerating steps (a) and (b).

4. A meted as defined in claim 2, wherein:
   the accelerating step (a) comprises accelerating the medium at the first acceleration rate between an initial time corresponding to an initial rotational velocity and a first predetermined time; and
   the accelerating step (b) comprises accelerating the medium at the second acceleration rate between the first predetermined time and a second predetermined time.

5. A method as defined in claim 2, wherein the moving step (c) comprises a step of displacing the transducer from a landing zone.

6. A method as defined in 2, wherein one of the first velocity and second velocity is an early exit velocity creating an air bearing as the transducer exits a landing zone.

7. A method as defined in claim 6 further comprising a step of (d) accelerating the medium at a third acceleration rate between the first and second acceleration rates.

8. The method of claim 2 wherein the step of moving is responsive to the medium rotating at the second velocity.

9. The method of claim 1 wherein the first acceleration rate is greater than the second acceleration rate.

10. An apparatus including circuitry and executable program instructions that are configured to perform an exit sequence comprising steps of:
    (a) accelerating a storage disc at a first acceleration rate;
    (b) accelerating the storage disc at a different second acceleration rate; and
    (c) as the storage disc rotates at a one of the group consisting of the first acceleration rate and the second acceleration rate, moving a transducer from a landing zone region of the storage disc to a data storage region of the storage disc.

11. An apparatus as defined in claim 10, wherein a one of the accelerating steps (a) and (b) achieves a threshold velocity creating an air bearing as the transducer radially traverses across the disc between an inner diameter and an outer diameter.

12. An apparatus as defined in claim 11, wherein the threshold velocity is an early-exit velocity.

13. The apparatus of claim 11 wherein the moving step is responsive to the storage disc rotating at the first acceleration rate.

14. The apparatus of claim 11 wherein the moving step is responsive to the storage disc rotating at the second acceleration rate.

15. An apparatus as defined in claim 10, wherein:
    the accelerating step (a) comprises accelerating the storage disc at the first acceleration rate between an initial time corresponding to an initial rotational velocity and a first time; and
    the accelerating step (b) comprises accelerating the storage disc at the second acceleration rate between the first predetermined time and a second predetermined time.

16. An apparatus as defined in claim 10, wherein the accelerating step (b) achieves a target velocity.

17. An apparatus as defined in claim 16, wherein the exit sequence further comprises a step of (d) accelerating the storage disc at a different third acceleration rate between the first and second acceleration rates.

18. The apparatus of claim 10 wherein the accelerating step (a) accelerates the storage disc at the first acceleration rate to a first predetermined rotational velocity and the accelerating step (b) accelerates the storage disc at the second acceleration rate to a second predetermined rotational velocity.

19. An apparatus comprising:
    a transducer attached to an actuator arm and parkable on a landing zone on a surface of a medium, the transducer being operable to fly adjacent the surface of the medium when the medium reaches a desired velocity; and
    circuitry configured for accelerating the medium at multiple acceleration rates to achieve the desired velocity.

20. An apparatus as defined in claim 19 wherein the circuitry is configured for moving the transducer from adjacent the landing zone responsive to the medium achieving the desired velocity.

21. An apparatus as defined in claim 20, wherein the desired velocity is a final rotational velocity.

22. An apparatus as defined in claim 20, wherein the desired velocity is an early exit velocity.

23. A multi-phase acceleration system capable of increasing rotational velocity of a storage medium by accelerating the medium at multiple acceleration rates within predetermined time intervals.

24. A method for increasing rotational velocity of a storage medium comprising accelerating the medium at multiple acceleration rates within predetermined time intervals.

* * * * *